(12) United States Patent
Choi et al.

(10) Patent No.: US 10,742,737 B2
(45) Date of Patent: Aug. 11, 2020

(54) STORAGE DEVICE AND ELECTRONIC DEVICE INCLUDING THE SAME

(71) Applicant: Samsung Electronics Co., Ltd., Suwon-si, Gyeonggi-do (KR)

(72) Inventors: Younggeun Choi, Suwon-si (KR); Jaehong Min, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 101 days.

(21) Appl. No.: 16/028,791

(22) Filed: Jul. 6, 2018

(65) Prior Publication Data
US 2019/0166201 A1    May 30, 2019

(30) Foreign Application Priority Data

Nov. 30, 2017  (KR) ......................... 10-2017-0163369

(51) Int. Cl.
*H04L 29/08* (2006.01)
*G06F 3/06* (2006.01)

(52) U.S. Cl.
CPC .......... *H04L 67/1097* (2013.01); *G06F 3/067* (2013.01); *G06F 3/0613* (2013.01); *G06F 3/0656* (2013.01); *G06F 3/0659* (2013.01); *H04L 67/1078* (2013.01); *H04L 67/20* (2013.01)

(58) Field of Classification Search
CPC . H04L 67/1097; H04L 67/20; H04L 67/1078; G06F 3/0613; G06F 3/0659; G06F 3/067; G06F 3/0656; G06F 3/0679; G06F 3/061
See application file for complete search history.

(56) References Cited

U.S. PATENT DOCUMENTS

| 7,302,512 B1 | 11/2007 | Currid et al. |
| 8,554,968 B1 * | 10/2013 | Onufryk ................. G06F 13/24 710/260 |
| 8,677,068 B2 | 3/2014 | Canepa et al. |
| 8,706,942 B2 | 4/2014 | Madukkarumukumana et al. |

(Continued)

OTHER PUBLICATIONS

Agostini, "Offloading communication control logic in GPU accelerated applications", May 14, 2017, 2017 17th IEEE/ACM International Symposium on Cluster, Cloud and Grid Computing, p. 248-257. (Year: 2017).*

(Continued)

*Primary Examiner* — Arvin Eskandarnia
*Assistant Examiner* — Chhian (Amy) Ling
(74) *Attorney, Agent, or Firm* — Harness, Dickey & Pierce, P.L.C.

(57) ABSTRACT

An electronic device includes a storage device including a plurality of doorbell registers; a host configured to perform a first interface operation with the storage device using a first command queue managed by a first doorbell register from among the plurality of doorbell registers; and a third-party device configured to perform a second interface operation with the storage device using a second command queue managed by a second doorbell register from among the plurality of doorbell registers, without an intervention of the host, wherein at least the second doorbell register is allocated as one of one or more dedicated registers for use only with operations of the third-party device.

20 Claims, 7 Drawing Sheets

(56) References Cited

U.S. PATENT DOCUMENTS

| | | |
|---|---|---|
| 8,914,556 B2 | 12/2014 | Magro et al. |
| 9,535,867 B2 | 1/2017 | Su et al. |
| 9,557,922 B2* | 1/2017 | McCambridge et al. |
| 2010/0095080 A1* | 4/2010 | Bauman ............... G06F 9/5077 711/165 |
| 2012/0079234 A1* | 3/2012 | Tarta ..................... G06F 9/466 712/28 |
| 2016/0210062 A1* | 7/2016 | McCambridge ...... G06F 3/0613 |
| 2017/0083252 A1 | 3/2017 | Singh et al. |
| 2017/0177216 A1 | 6/2017 | Freyensee et al. |
| 2019/0102317 A1* | 4/2019 | Friedman ............. G06F 9/5016 |

OTHER PUBLICATIONS

Wikipedia, "eXtensible Host Controller Interface", 3 pages, Sep. 13, 2017. (Year: 2017).*
Webopedia, "Controller", 1 page, Dec. 11, 2019. (Year: 2019).*

* cited by examiner

STORAGE DEVICE AND ELECTRONIC DEVICE INCLUDING THE SAME

CROSS-REFERENCE TO RELATED APPLICATIONS

This application claims priority under 35 U.S.C. § 119 of Korean Patent Application No. 10-2017-0163369, filed on Nov. 30, 2017, in the Korean Intellectual Property Office, the entire contents of which are incorporated herein by reference.

BACKGROUND

1. Field

At least some example embodiments of the inventive concepts relate to an electronic device, and more particularly, to an interface operation of an electronic device including a storage device.

2. Related Art

As a representative example of a data storage device on the basis of a flash memory device, there is Solid State Drive (SSD). Example interfaces used with a data storage device such as the SSD include Serial Advanced Technology Attachment (SATA), Peripheral Component Interconnect express (PCIe), Serial Attached SCSI (SAS), and the like. A performance of the SSD is gradually improving, and the amount of data processed at the same time is gradually increasing. However, since an interface such as the SATA is not an interface specialized for a data storage device such as the SSD, it has a fundamental limitation.

Recently, NVM express (NVMe) has been created as a standardized interface that can be applied to the SSD. The NVMe provides a direct memory access function to storage devices connected through a Peripheral Component Interconnect Express (PCIe) bus.

SUMMARY

According to at least some example embodiments of the inventive concepts, an electronic device includes a storage device including a plurality of doorbell registers; a host configured to perform a first interface operation with the storage device using a first command queue managed by a first doorbell register from among the plurality of doorbell registers; and a third-party device configured to perform a second interface operation with the storage device using a second command queue managed by a second doorbell register from among the plurality of doorbell registers, without an intervention of the host, wherein at least the second doorbell register is allocated as one of one or more dedicated registers for use only with operations of the third-party device.

According to at least some example embodiments of the inventive concepts, a storage device configured to communicate with a host and a third-party device includes a non-volatile memory; and a controller configured to manage an operation of writing data to the non-volatile memory or an operation of reading data from non-volatile memory, wherein the controller includes a plurality of doorbell registers, at least one of the plurality of doorbell registers is allocated for an interface operation with the third-party device, and the interface operation with the third-party device is performed based on a command queue managed by the at least one doorbell register, without a intervention of the host.

According to at least some example embodiments of the inventive concepts, a storage device configured to communicate with a host and a third-party device includes a buffer memory; a non-volatile memory; and a controller configured to manage an operation of writing a data to the non-volatile memory or an operation of reading a data from non-volatile memory, wherein the controller comprises at least one doorbell register configured to manage a submission queue and a completion queue for communicating with the third-party device, and wherein the controller is configured to read data requested by the third-party device from the non-volatile memory and store the read data in the buffer memory in response to a command received from the third-party device.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
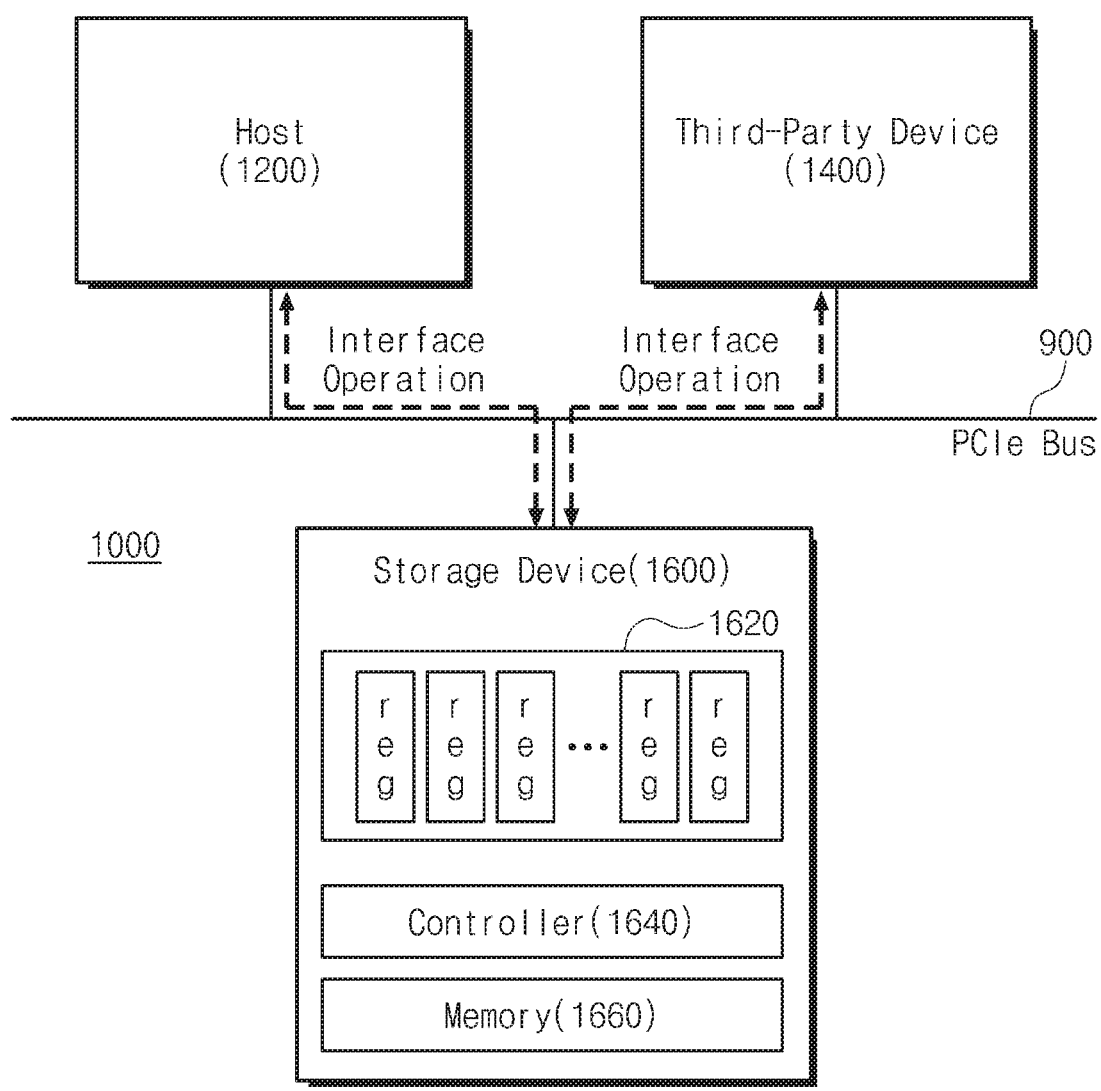
FIG. 1 is a block diagram illustrating an electronic device according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram illustrating an electronic device according to at least one example embodiment of the inventive concepts.

An electronic device 1000 may store and manage data to provide a user with necessary information. The electronic device 1000 may be a mobile electronic device such as a personal computer, a notebook computer, a mobile phone, a personal digital assistant, or a camera, but it is not limited thereto.

The electronic device 1000 may include a host 1200, a third-party device 1400, and a storage device 1600. The host 1200, the third-party device 1400, and the storage device 1600 may be connected to each other through a bus 900. The bus 900 may be a Peripheral Component Interconnect Express (PCIe) bus using a PCIe mode. PCIe is a high speed serial computer expansion bus standard designed to replace Peripheral Component Interconnect (PCI), Peripheral Component Interconnect eXtended (PCI-X), and Accelerated Graphics Port (AGP) bus standards.

The host 1200, the third-party device 1400, and the storage device 1600 may communicate with each other using an interface (e.g., NVMe protocol) based on a command queue. This will be described in detail below.

The host 1200 may provide various services to a user of the host 1200 according to operations of one and more electronic circuits, chips, and devices. The host 1200 according to at least one example embodiment of the inventive concepts may perform various operations to process instructions received from the user of the host 1200 and may provide results of the operations to the user of the host 1200. The host 1200 according to at least one example embodiment of the inventive concepts may include an operation system and an application. The host 1200 according to at least one example embodiment of the inventive concepts may include a NVMe driver to support the NVMe protocol. The host 1200 according to at least one example embodiment of the inventive concepts may include an operation processor (e.g., Central Processing Unit (CPU), Graphic processing unit (GPU), and Application Processor (AP)) including a dedicated logic circuit (e.g., Field Programmable Gate Array (FPGA) and Application Specific Integrated Circuits (ASICs)), but it is not limited thereto.

The host 1200 according to at least one example embodiment of the inventive concepts may be included to a single electronic device with the third-party device 1400 and the storage device 1600. In this example, the host 1200 may be the operation processor itself.

The storage device 1600 may store data. The storage device 1600 may include a controller 1640 and a memory 1660. For example, the storage device 1600 may be Solid State Drive (SSD) for supporting the NVMe protocol.

The controller 1640 may control overall operations of the storage device 1600. For example, the controller 1640 may schedule operations of the memory 1660 or may encode and decode signals/data processed in the storage device 1600. For example, the controller 1640 may control the memory 1660 to allow the memory 1660 to store or output data The controller 1640 may receive a command from the host 1200 or the third-party device 1400 and may perform various operations in response to the received command. The command may be a command based on the NVMe protocol.

The controller 1640 may be connected to the memory 1660 through a plurality of channels. The controller 1640 may include a hardware and a software (not shown) for performing operations in response to various requests from the host 1200 or the third-party device 1400. The controller 1640 according to at least one example embodiment of the inventive concepts may include a volatile memory such as Dynamic Random Access Memory (DRAM), Static Random Access Memory (SRAM), and Synchronous DRAM (SDRAM).

The controller 1640 may include one or more hardware components (e.g., an analog circuit, a logic circuit, etc.) configured to perform functions described above and described below. Additionally or alternatively, the controller 1640 may include one or more processor cores. The functions of the controller 1640 described above and described below may be implemented in a program code of a software and/or a firmware, and the processor core(s) of the controller 1640 may execute an instruction set of the program code. The processor core(s) of the controller 1640 may process various types of arithmetic calculations and/or logic operations for executing the instruction set.

The memory 1660 may include one or more non-volatile memories. For example, the memory 1660 may include a plurality of flash memories. For example, the memory 1660 may include different types of non-volatile memories examples of which include, but are not limited to, Phase-change Random Access Memory (PRAM), Magneto-resistive Random Access Memory (MRAM), and Ferro-electric Random Access Memory (FRAM). The memory 1660 may store one bit of data or two or more bits of data per memory cell. Additionally, the non-volatile memory configuration the memory 1660 may include a memory cell array having a three-dimensional structure.

The third-party device 1400 may be any device capable of writing data to the storage device 1600 or reading data from the storage device 1600 in a direct memory access method without an intervention of the host 1200.

According to at least one example embodiment of the inventive concepts, the third-party device 1400 may perform a peer-to-peer communication with the storage device 1600. For example, the peer-to-peer communication between the third-party device 1400 and the storage device 1600 may be performed through the PCIe bus 900 using the direct memory access method. In this case, each of the third-party device 1400 and the storage device 1600 may be a peer. When the peer-to-peer communication between the third-party device 1400 and the storage device 1600 may be performed, the third-party device 1400 and the storage device 1600 may operate as a client and a server, respectively.

According to at least one example embodiment of the inventive concepts, the third-party device 1400 may be a GPU that obtains input data from the storage device 1600 using the direct memory access method. Alternatively, the third-party device 1400 may include a hardware accelerator capable of accelerating an operation by performing a CPU offload.

Describing the storage device 1600 again, the storage device 1600 may communicate with the host 1200 or the third-party device 1400 based on an interface based on a command queue (hereinafter referred to as a command queue based interface) such as the NVMe protocol. An operation of the command queue based interface may be performed based on a queue pair, including a submission queue (SQ) for inputting a requested command and a completion queue (CQ) for recording a processing result of the command. A queue pair that includes a submission queue and a completion queue may also be referred to, in the present disclosure, as a command queue.

When the host 1200 includes a plurality of cores, each of the plurality of cores may perform an interface operation with the storage device 1600 based on one queue pair including one submission queue and one completion queue. Additionally, when a plurality of third-party device 1400 are provided, each of the plurality of third-party device 1400 may perform an interface operation with the storage device 1600 based on one queue pair including one submission queue and one completion queue.

The storage device 1600 may include doorbell registers 1620 for performing the command queue based interface operation. For the convenience of explanation, the doorbell registers 1620 are shown separate from controller 1640, but according to at least one example embodiment of the inventive concepts, the doorbell registers 1620 may be included in the processor core within the controller 1640.

Each of the doorbell registers 1620 is register for managing or controlling a queue pair generated by the host 1200 or the third-party device 1400. Each of the doorbell registers 1620 may correspond to one queue pair. For example, each of the doorbell registers 1620 may store a pointer that indicates a tail of the submission queue and a pointer that indicates a head of the completion queue. The storage device 1600 may access to a queue pair corresponding to each of the doorbell registers 1620 to perform an interface operation with the host 1200 or third-party device 1400.

Figure 2:
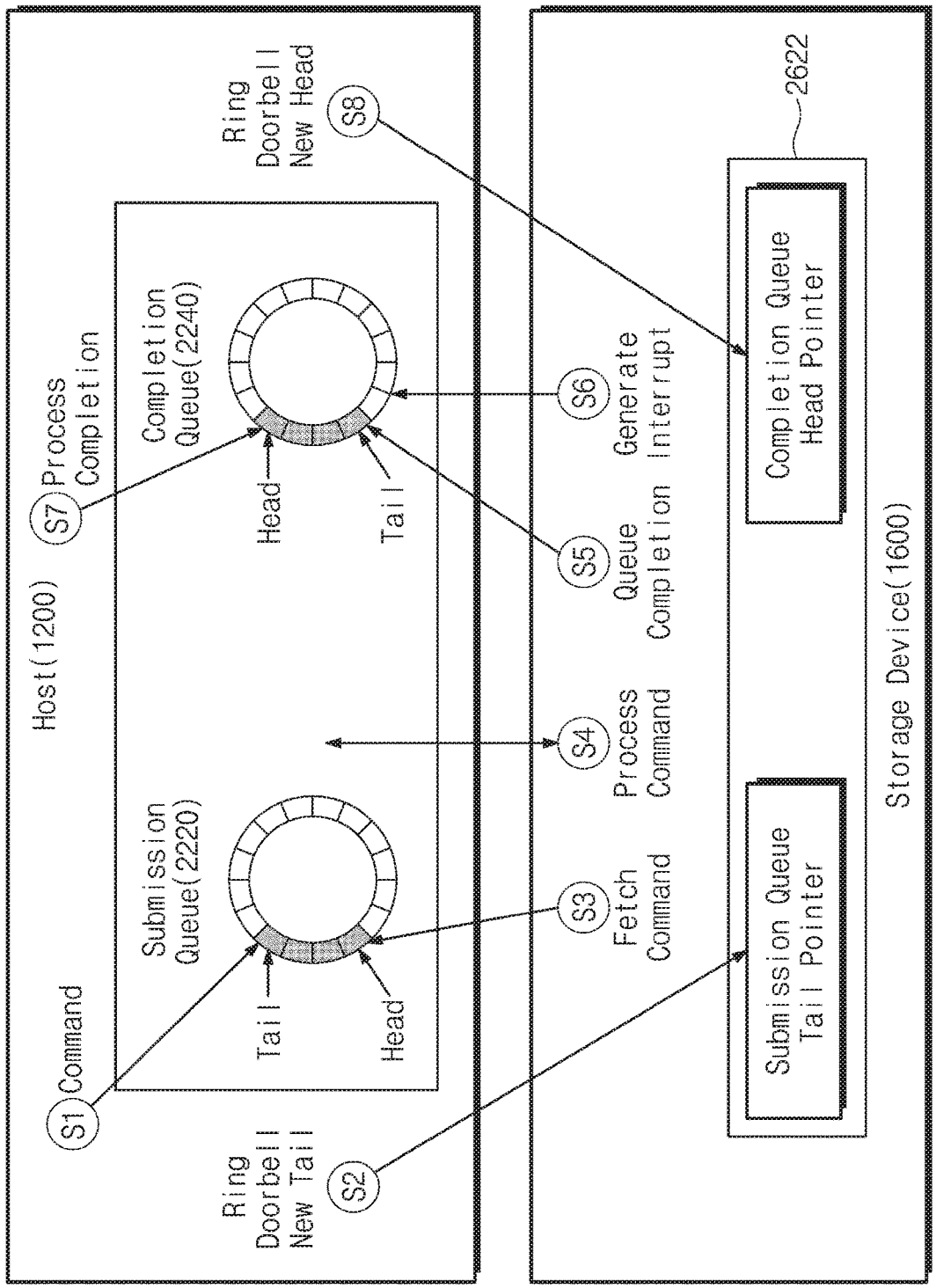
FIG. 2 is view for describing the command queue based interface operation according to at least one example embodiment of the inventive concepts.

FIG. 2 is view for describing the command queue based interface operation according to at least one example embodiment of the inventive concepts. Referring to FIG. 2, the host 1200 may generate a submission queue 2220 and a completion queue 2240. When the host 1200 includes the plurality of cores, the submission queue 2220 and the completion queue 2240 may be a queue pair generated corresponding to one core of the plurality of cores. According to at least one example embodiment of the inventive concepts, the queue pair may generated in a memory on the host 1200.

The doorbell register 2622 may be one doorbell register of the doorbell registers 2622 shown in FIG. 1. The doorbell register 2622 is a register allocated to manage the submission queue 2220 and the completion queue 2240. For example, the storage device 1600 may access the submission queue 2220 and the completion queue 2240 through the doorbell registers 2622 to perform the command queue based interface operation with the host 1200.

The host 1200 according to at least one example embodiment of the inventive concepts may request the storage device 1600 to perform a command (e.g., reading and writing data). The host 1200 may submit (or input) the command to the submission queue 2220 (S1). A tail pointer of the submission queue 2220 is updated, and the host 1200 may transmit the updated submission queue tail pointer to the storage device 1600 (S2). For example, the updated submission queue tail pointer may be written to the doorbell register 2622 of the storage device 1600.

The storage device 1600 may fetch the command from the submission queue 2220 (S3). The storage device 1600 may process (or execute) the fetched command (S4). After the processing of the command, the storage device 1600 may write to the completion queue 2240 that the processing of the command is completed (S5). The storage device 1600 may write a completion queue entry to the completion queue 2240. At this time, a head pointer of the completion queue 2240 may increase. The storage device 1600 (e.g., the controller 1640) may generate an interrupt signal (S6). The interrupt signal may be a signal based on a pin or an interrupt signal based on a message signal.

The host 1200 may process a command completion (S7). The host 1200 may transmit the updated completion queue head pointer to the storage device 1600. For example, the updated completion queue head pointer may be written to the doorbell register 2622 of the storage device 1600.

Accordingly, the submission queue 2220 includes entries corresponding to commands issued by the host 1200, and the completion queue 2240 includes entries corresponding to commands that have been completed (e.g., commands of the host 1200 that have been completed by the storage device 1600).

Although the command queue based interface operation between one core of the host 1200 and the storage device 1600 is described with reference to FIG. 2, an interface operation between the third-party device 1400 and the storage device 1600 may be performed in the same method.

Referring again to FIG. 1, when the host 1200 includes the plurality of cores, the host 1200 may generate a queue pair corresponding to each of the plurality of cores and may request the storage device 1600 to allocate doorbell registers for managing the generated queue pairs. For example, the NVMe driver provided in an operation system on the host 1200 (e.g., Linux) may request the storage device 1600 to allocate as many doorbell registers as the number of cores monitored in the operation system.

When the number of the cores of the host 1200 is more than the number of the doorbell registers 1620, all doorbell registers 1620 may be allocated for the command queue based interface operation with the host 1200. In this case, doorbell registers allocated for the command queue based interface operation between the third-party device 1400 and the storage device 1600 do not exist. Therefore, the command queue based interface operation using the direct memory access method between the third-party device 1400 and the storage device 1600 may not be performed. An intervention of the host 1200 may be required for the command queue based interface operation between the third-party device 1400 and the storage device 1600.

Figure 3:
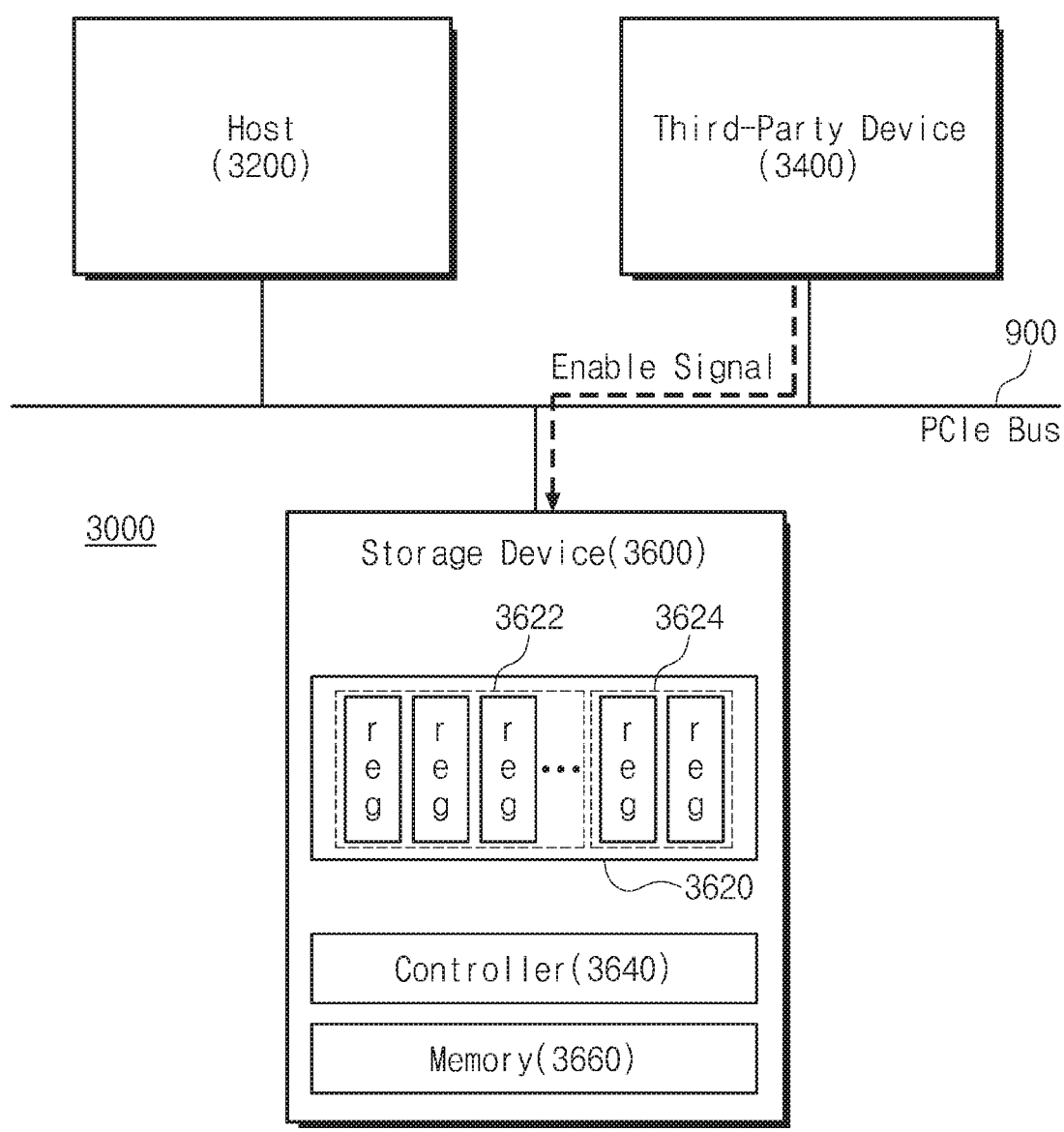
FIG. 3 is a block diagram illustrating an electronic device according to at least one example embodiment of the inventive concepts.

FIG. 3 is a block diagram illustrating an electronic device according to at least one example embodiment of the inventive concepts.

An electronic device 3000 shown in FIG. 3 represents one embodiment of the electronic device 1000 shown in FIG. 1. Therefore, the above description of the electronic device 1000 shown in FIG. 1 may also be applied to the electronic device 3000 shown in FIG. 3. For example, a host 3200, a third-party device 3400, and a storage device 3600 shown in FIG. 1 may correspond to the host 1200, the third-party device 1400, and the storage device 1600 shown in FIG. 1, respectively.

At least one doorbell register of doorbell registers 3620 may be allocated for a command queue based interface with the third-party device 3400. For example, the doorbell registers 3622 are allocated for a command queue based interface with the host 3200, and the doorbell registers 3624 are allocated for the command queue based interface with the third-party device 3400.

The doorbell registers 3624 are dedicated registers only allocated for the command queue based interface operation with the third-party device 3400. For example, each of the doorbell registers 3624 may be allocated as a dedicated register for use only with interface operations of the third-party device 3400 (and not operations of the host 3200). Therefore, the doorbell registers 3624 may not be used for a command queue based interface operation between the host 3200 and the storage device 3600. The storage device 3600 may perform the command queue based interface operation with the third-party device 3400 through the doorbell registers 3624.

According to at least one example embodiment of the inventive concepts, the number of the doorbell registers that the host 3200 requests to allocate to the storage device 3600 may be determined to be less than the maximum number of doorbell registers that may be generated in the storage device 3600. For this configuration, a driver of the host 3200 (e.q., NVMe driver) may be modified. However, when the number of the doorbell registers that the host 3200 requests to allocate to the storage device 3600 through the modification of the driver of the host 3200 is fixed, a performance of overall interface operations of the electronic device 3000 may be degraded. For example, when the command queue based interface operation between the storage device 3600 and the third-party device 3400 is not required (e.g., when the third-party device 3400 does not use the peer-to-peer communication with the storage device 3600), a performance of the interface operation performed between the host 3200 and the storage device 3600 may be degraded.

According to at least one example embodiment of the inventive concepts, the storage device 3600 may receive an enable signal (or an initialization command) for allocating the doorbell registers 3620 from an external source. For example, a controller 3640 may receive the enable signal (illustrated in FIG. 3 as "Enable Signal"). The storage device 3600 according to at least one example embodiment of the inventive concepts may receive the enable signal to allocate the doorbell registers 3620 from at least one of the host 3200, the third-party device 3400, and other external device (not shown). For example, the storage device 3600 may receive the enable signal from the third-party device 3400 to determine the number of doorbell registers to be allocated for the command queue based interface operation with the third-party device 3400. The storage device 3600 receiving the enable signal may allocate at least one of the doorbell registers 3620 for the command queue based interface operation with the third-party device 3400. For example, in the example illustrated in FIG. 3, the enable signal received by the storage device 3600 includes information instructing the storage device 3600 to allocate two doorbell registers as dedicated registers for use only with interface operations of the third party device 3400, and the storage device 3600 responds to the enable signal by allocating two of the doorbell registers 3620 (i.e., doorbell registers 3624) as the dedicated registers. Accordingly, the storage device 3600 may determine the number of doorbell registers to allocate as dedicated registers for use only with interface operations of the third party device 3400 based on the enable signal.

According to at least one example embodiment of the inventive concepts, the storage device 3600 may include a control register for managing the number of one or more doorbell registers allocated for the command queue based interface operation with the third-party device 3400. For example, the controller 3640 may include the control register (not illustrated). The storage device 3600 may determine the number of the one or more registers allocated for the command queue based interface operation with the third-party device 3400 based on the number information recorded in the control register.

According to at least one example embodiment of the inventive concepts, the host 3200 and the third-party device 3400 may access to the same area of a memory 3660 (e.g., the same Logical Block Address (LBA)). The memory 3660 may include at least one non-volatile memory. For example, when the third-party device 3400 is CPU and the host 3200 is the CPU implementing an application (e.g., General-Purpose computing on Graphics Processing Units (GPGPU) Application) using GPU, the storage device 3600 may receive a file to be input to the GPU from the CPU and may store the file in the memory 3660. The storage device 3600 may output the stored file from the memory 3660 to the GPU in response to request from the GPU.

However, when the host 3200 and the third-party device 3400 may access the same area on a memory 3660 at the same time, a consistency of data may be corrupted. For example, when the CPU requests to write data to an area having an address of LBA0 on the memory 3660 and the third-party device 3400 requests to read or write data to the same area (address: LBA0) at the same time, the consistency of the data stored in the memory 3660 may not be guaranteed.

In this case, the storage device 3600 may inform the host 3200 and/or the third-party device 3400 that the data is corrupt. The storage device 3600 may determine whether or not the consistency of the data is corrupted and may transmit the determined result to the host 3200 or the third-party device 3400. For example, the controller 3640 may check requests received or executed for a period of time to determine whether or not the data is corrupted and may transmit the determined result to the host 3200 or the third-party device 3400. The determined result as to whether or not the data is corrupted may be transmitted to the host 3200 or the third-party device 3400 in the step (S5 shown in FIG. 2) writing the completion of the execution of the command to the completion queue after processing the command or in the step (S6 shown in FIG. 2) generating the interrupt signal after processing the command, but it is not limited thereto.

Figure 4:
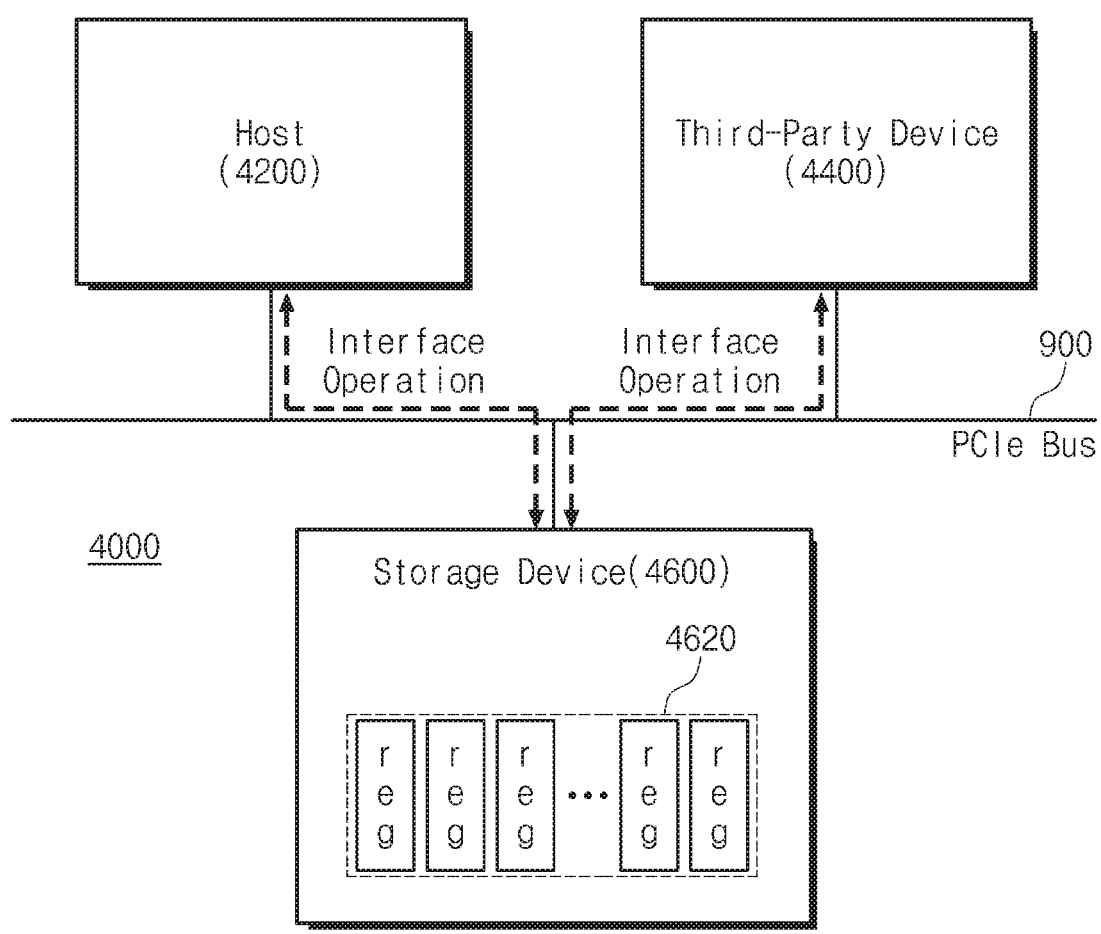
FIG. 4 is a block diagram illustrating an electronic device according to at least one example embodiment of the inventive concepts.

FIG. 4 is a block diagram illustrating an electronic device according to at least one example embodiment of the inventive concepts.

The number of doorbell registers allocated for the command queue based interface operation with the third-party device 4400 of doorbell registers 4620 of a storage device 4600 may be variously adjusted.

According to at least one example embodiment of the inventive concepts, all doorbell registers 4620 of the storage device 4600 may be allocated for the command queue based interface operation with the host 4200. Such a configuration may be useful when the command queue based interface operation between the storage device 4600 and the third-party device 4400 is not required (e.g., when the third-party device 4400 does not use the peer-to-peer communication with the storage device 4600).

According to at least one example embodiment of the inventive concepts, all doorbell registers 4620 of the storage device 4600 may be allocated for the command queue based interface operation with the third-party device 4400. Such a configuration may be useful when the interface operation between the storage device 4600 and the host 4200 is not required.

According to at least one example embodiment of the inventive concepts, some of doorbell registers 4620 of the storage device 4600 may be allocated for the command queue based interface operation with the host 4200 and the remainder may be allocated for the command queue based interface operation with the third-party device 4400, for example, in accordance with the doorbell register allocation scheme discussed above with reference to FIG. 3.

The allocation operation of the doorbell registers 4620 described above may also be applied to an interface operation for a plurality of applications or operations within one host 4200. For example, some of doorbell registers 4620 of the storage device 4600 may be allocated for the command queue based interface operation to execute a general application of the host 4200 and the remainder may be allocated for the command queue based interface operation to execute a special application of the host 4200. For example, the special application may refer to an application using a special command or requiring a reference QoS (Quality of Service). Therefore, when the command queue based interface operation between the storage device 4600 and the third-party device 4400 is not required, the doorbell registers 4620 may be managed as a plurality of groups according to the plurality of applications or the operations within the host 4600.

Figure 5:
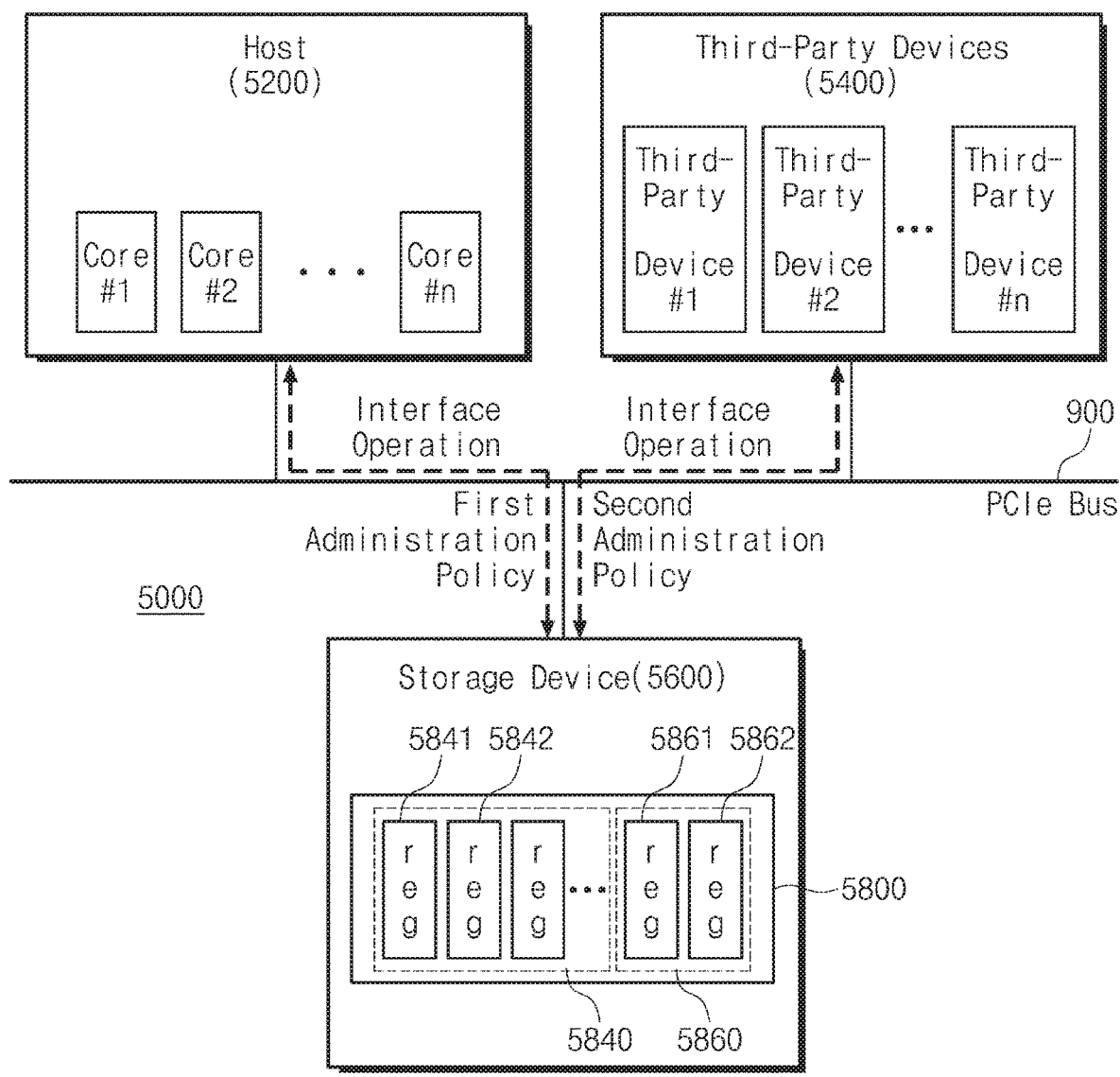
FIG. 5 is a conceptual diagram illustrating a management policy independently applied to each interface operation according to at least one example embodiment of the inventive concepts.

FIG. 5 is a conceptual diagram illustrating a management policy independently applied to each interface operation according to at least one example embodiment of the inventive concepts.

An electronic device 5000 may include a host 5200 including a plurality of cores, a plurality of third-party devices 5400, and a storage device 5600 communicating with the host 5200 and the plurality of third-party devices 5400 based on a command queue based interface.

Doorbell registers 5840 of doorbell registers 5800 may be allocated for a command queue based interface operation with the host 5200 and doorbell registers 5860 of doorbell registers 5800 may be allocated for a command queue based interface operation with the third-party devices 5400.

The storage device 5600 may execute commands requested from the plurality of cores of the host 5200 through the doorbell register 5840. For example, a doorbell register 5841 may manage a queue pair generated from a core #1, and a doorbell register 5842 may manage a queue pair generated from a core #2.

The storage device 5600 may execute commands requested from the plurality of the third-party devices 5400 through the doorbell register 5860. For example, a doorbell register 5861 may manage a queue pair generated from a third-party device #1, and a doorbell register 5862 may manage a queue pair generated from a third-party device #2.

The electronic device 5000 may be applied to different administration policies to the command queue based interface operation between the storage device 5600 and the host 5200 and the command queue based interface operation between the storage device 5600 and the plurality of third-party devices 5400.

The administration policy is referred to as a method for determining the order of fetching and processing commands from the master device (e.g., the cores of the host 5200 or the plurality of third-party devices 5400). Alternatively, the administration policy is referred to as a restrictive condition applied to the command queue based interface operation.

According to at least one example embodiment of the inventive concepts, an order in which the storage device 5600 fetches and processes command from the plurality of cores Core #1, Core #2, . . . , Core # n of the host 5200 and an order in which the storage device 5600 fetches and processes command from the plurality of third-party devices Third-party device #1, Third-party device #2, . . . , Third-party device # n 5400 may be determined independently.

For example, the order in which the storage device 5600 fetches and processes the command from queue pairs generated by the plurality of cores Core #1, Core #2, . . . , Core # n of the host 5200 may be determined based on a round-robin method.

However, the order in which the storage device 5600 fetches and processes the commands from queue pairs generated by the plurality of third-party devices 5400 may be determined based on a priority or a characteristic of each of the plurality of the third-party devices 5400. Alternatively, the order in which the storage device 5600 fetches and processes the command from the queue pairs generated by the plurality of third-party devices 5400 may be determined based on a desired or, alternatively, predetermined specific pattern.

According to at least one example embodiment of the inventive concepts, different restrictive conditions may be applied to the command queue based interface operation between the storage device 5600 and the host 5200 and the command queue based interface operation between the storage device 5600 and the plurality of third-party devices 5400 for the efficiency of the command processing.

For example, the size of data that may be transmitted when the command queue based interface operation between the storage device 5600 and the plurality of third-party devices 5400 is performed may be larger than the size of data that may be transmitted when the command queue based interface operation between the storage device 5600 and the host 5200 is performed. That is, the transmission of a large amount of data (e.g., Large Maximum Data Transfer Size) may be allowed for the command queue based interface operation between the storage device 5600 and the plurality of third-party devices 5400.

Additionally, a physical region page (PRP) and a scatter/gather list (SGL) used with the command queue based interface operation between the storage device 5600 and the plurality of third-party devices 5400 may be different from that used with the command queue based interface operation between the storage device 5600 and the host 5200.

Figure 6:
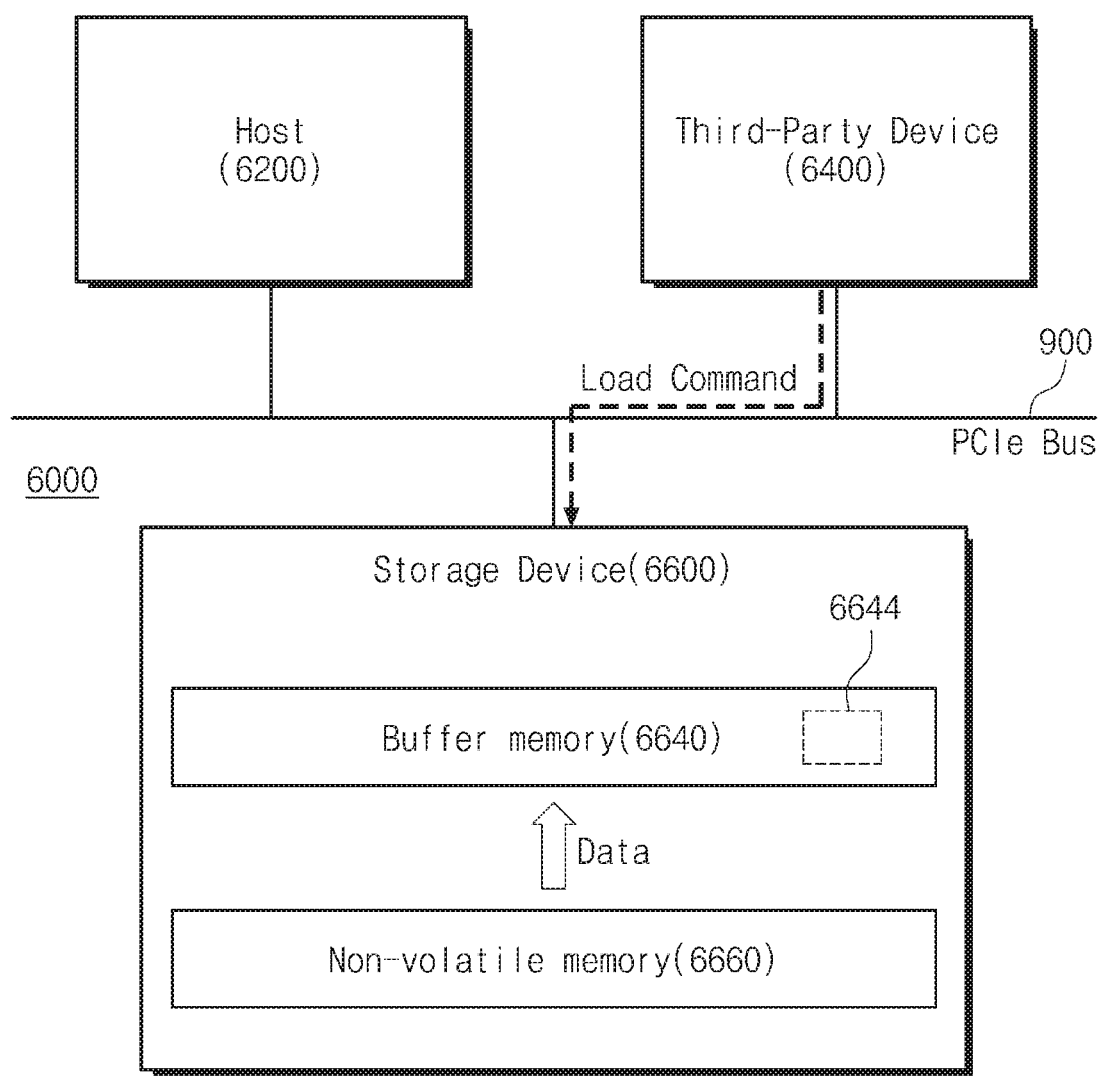
FIG. 6 is view for describing an operation of loading data of an electronics device according to at least one example embodiment of the inventive concepts.

FIG. 6 is view for describing an operation of loading data of an electronics device according to at least one example embodiment of the inventive concepts.

As described above with reference to FIG. 1 to FIG. 5, a storage device 6600 may be connected to a host 6200 and a third-party device 6400 through the PCIe bus 900. The third-party device 6400 may access, directly, a non-volatile memory 6660 of the storage device 6600 using a command queue based interface method (e.g., the NVMe protocol) without an intervention of the host 1200. For this configuration, it is described above that at least one doorbell register of a plurality of doorbell registers of the storage device 6600 may be allocated for a command queue based interface with the third-party device 6400.

The storage device 6600 according to at least one example embodiment of the inventive concepts may receive a command (hereinafter, it is referred to as a load command) from the third-party device 6400 to load data in a buffer memory 6640 of the storage device 6600. The load command may allow a necessary data to be loaded in an external area accessible (e.g., a memory addressing) by the third-party device 6400 when a space for storing data in the third-party device 6400 is very small. Therefore, the third-party device 6400 may access to the external area to process data.

The buffer memory 6640 according to at least one example embodiment of the inventive concepts may include Dynamic Random Access Memory (DRAM), Synchronous DRAM (SDRAM), Magnetic Random Access Memory (MRAM), and Phase-change Random Access Memory (PRAM), it is not limited thereto. For example, a controller (not shown) of the storage device 6600 may include the buffer memory 6640.

The storage device 6600 receiving the load command may read a requested data from the non-volatile memory 6660 and load the read data in the buffer memory 6640. That is, the storage device 6600 receiving the load command may read the requested data from the non-volatile memory 6660 and store the data in a partial area 6644 of the buffer memory 6640 instead of transmitting the data to the third-party device 6400.

As described above with reference to FIG. 2, the load command may be executed based on a queue pair including a submission queue for submission (or input) of the load command and a completion queue for recording a processing result of the load command. At least one doorbell register (not shown) allocated for the interface with the third-party device 6400 may be configured to manage the submission queue and the completion queue executing the load command. For example, the doorbell register may be configured to manage a tail pointer of the submission queue and a head pointer of the completion queue. An operation in which the third-party device 6400 and the storage device 6600 execute the load command is the same as described with reference to FIG. 2.

The storage device 6600 according to at least one example embodiment of the inventive concepts may determine the partial area 6644 where data is stored. A processing of the load command may be completed by storing the data in the partial area 6644 and transmitting an address information of the partial area 6644 to the third-party device 6400. The address information of the partial area 6644 according to at least one example embodiment of the inventive concepts may be transmitted to the third-party device 6400 while the command queue based interface operation is performed.

For example, in the step (S5 shown in FIG. 2) writing (e.g., by a controller of the storage device 6600) a completion queue entry indicating the completion of the execution of the command to the completion queue after the storage device 6600 processes the load command, the completion queue entry may include the address information of the partial area 6644.

For example, in the step (S6 shown in FIG. 2) generating the interrupt signal after the storage device 6600 processes the load command, the interrupt signal may include the address information of the partial area 6644.

For example, a location where data is ultimately stored in the physical region page (PRP) and the scatter/gather list (SGL) used when the load command is submitted may be written to the buffer memory 6640.

According to at least one example embodiment of the inventive concepts, the storage device 6600 may convert a physical address of an area in which the data is stored on the non-volatile memory 6660 to a logical address and transmit the converted logical address to the third-party device 6400 instead of loading in the buffer memory 6640 data requested from the third-party device 6400.

For converting the physical address to the logical address, a mapping information indicating a corresponding relationship between the physical address and the logical address may be used. For example, the mapping information may be managed in a controller (not shown) of the storage device 6600.

Figure 7:
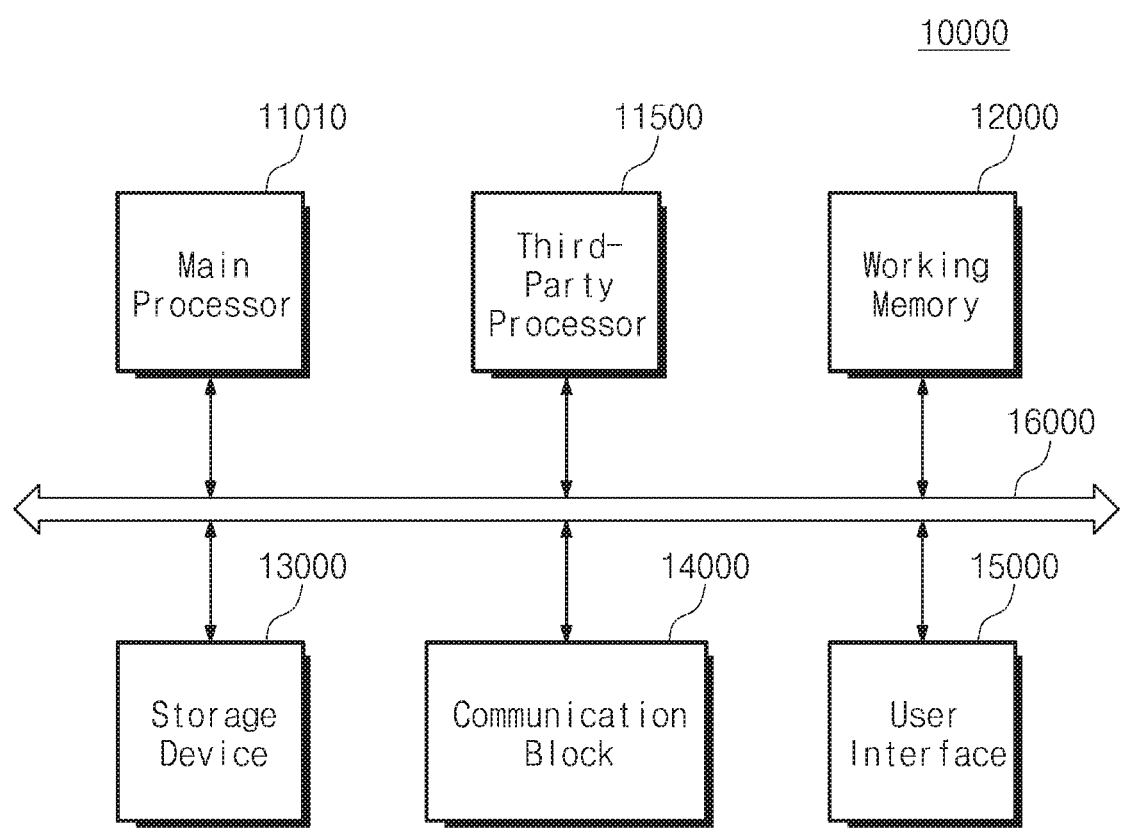
FIG. 7 is a block diagram illustrating a configuration of an electronic system including the electronic device according to at least one example embodiment of the inventive concepts.

FIG. 7 is a block diagram illustrating a configuration of an electronic system including the electronic device according to at least one example embodiment of the inventive concepts.

The electronic system 10000 may include a main processor 11010, a third-party processor 11500, a working memory 12000, a storage device 13000, a communication block 14000, a user interface 15000, and a bus 16000. According to at least some example embodiments of the inventive concepts, the electronic system 10000 may be one of electronic devices such as a desktop computer, a laptop computer, a tablet computer, a smart phone, a wearable device, a video game console, a workstation, a server, and an electric vehicle.

The electronic system 10000 according to at least one example embodiment of the inventive concepts may include one of electronic devices shown in FIG. 1 to FIG. 6. For example, the electronic system 10000 may include the electronic device 3000 shown in FIG. 3, it is not limited thereto.

The main processor 11010 may control the overall operations of the electronic system 10000. The main processor 11010 may process various types of arithmetic calculations and/or logical operations. The processor 1100 may include a special-purpose circuit (e.g., Field-Programmable Gate Array (FPGA) and Application-Specific Integrated Circuit (ASIC)). For example, the processor 1100 may include one or more processor cores and may be implemented as a general purpose processor, a dedicated microprocessor, or an application processor. The main processor 11010 may communicate with the storage device 13000 based on the command queue based interface (e.g., NVMe protocol).

The third-party processor 11500 may write data to the storage device 13000 or read data from the storage device 13000 based on a direct memory access method. Therefore, when the third-party processor 11500 accesses to the storage device 13000, an intervention or an interference of the main processor is not required. According to at least one example embodiment of the inventive concepts, the third-party processor 11500 may perform a peer-to-peer communication with the storage device 13000. For example, the peer-to-peer communication based on a PCIe bus may be performed between the third-party device 11500 and the storage device 13000.

For example, the third-party device 11500 may be a GPU that obtains input data from the storage device 13000 using the direct memory access method or may be a hardware accelerator capable of accelerating an operation by using a CPU offloading. The third-party device 11500 may communicate with the storage device 13000 based on the command queue based interface (e.g., the NVMe protocol).

The working memory 12000 may store data used in the operations of the electronic system 10000. For example, the working memory 12000 may temporarily store data processed or to be processed by the main processor 11010. The working memory 12000 may include a volatile memory such as Dynamic Random Access Memory (DRAM), Synchronous Dynamic Random Access Memory (SDRAM), and the like and/or a nonvolatile memory such as Phase-change Random Access Memory (PRAM), Magneto-resistive Random Access Memory (MRAM), Resistive Random Access Memory (ReRAM), Ferro-electric Random Access Memory (FRAM), and the like.

The storage device 13000 may include at least one memory device and a controller. The memory device of the storage device 13000 may store data regardless of a power supply. For example, the storage 13000 may include the nonvolatile memory such as a flash memory, the RPAM, the MRAM, the ReRAM, the FRAM, and the like. For example, the storage 13000 may include a storage medium such as Solid State Drive (SSD, a removable storage, an embedded storage, and the like.

The storage device 13000 may communicate with the main processor 11010 or the third-party processor 11500 based on the command queue based interface (e.g., the NVMe protocol). The storage device 13000 may include a plurality of doorbell registers for managing command queues generated by the main processor 11010 or the third-party processor 11500. At least one doorbell register of doorbell registers may be allocated for a command queue based interface operation with the third-party processor 11500.

The communication block 14000 may communicate with an external device/system of the electronic system 10000. For example, the communication block 14000 may support at least one of various wireless communication protocols such as Long Term Evolution (LTE), Worldwide Interoperability for Microwave Access (WIMAX), Global System for Mobile communications (GSM), Code Division Multiple Access (CDMA), Bluetooth, Near Field Communication (NFC), Wireless Fidelity (Wi-Fi), Radio Frequency Identification (RFID), and the like and/or at least one of various wire communication protocols such as Transfer Control Protocol/Internet Protocol (TCP/IP), Universal Serial Bus (USB), Firewire, and the like.

The user interface 15000 may arbitrate communication between an user and the electronic system 10000. For example, the user interface 15000 may include an input interface such as a keyboard, a mouse, a keypad, a button, a touch panel, a touch screen, a touch pad, a touch ball, a camera, a microphone, a gyroscope sensor, a haptic sensor, and the like. For example, the user interface 15000 may include an output interface such as Liquid Crystal Display (LCD) device, Light Emitting Diode (LED) display device, Organic LED (OLED) display device, Active Matrix OLED (AMOLED) display device, a speaker, a motor, and the like.

The bus 16000 may provide a communication path between the components of the electronic system 10000. The components of the electronic system 10000 may exchange data with each other based on a bus format of the bus 16000. For example, the bus format may include one or more of various interface protocols such as USB, Small Computer System Interface (SCSI), Peripheral Component Interconnect Express (PCIe), Mobile PCIe (M-PCIe), Advanced Technology Attachment (ATA), Parallel ATA (PATA), Serial ATA (SATA), Serial Attached SCSI (SAS), Integrated Drive Electronics (IDE), Enhanced IDE (EIDE), Nonvolatile Memory Express (NVMe), Universal Flash Storage (UFS), and the like.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An electronic device comprising:
a storage device including a plurality of doorbell registers;
a host processor configured to perform a first interface operation with the storage device using a first command queue, pointers corresponding to the first command queue being stored in a first doorbell register from among the plurality of doorbell registers; and
a third-party processor configured to perform a second interface operation with the storage device using a second command queue, pointers corresponding to the second command queue being stored in a second doorbell register from among the plurality of doorbell registers, without an intervention of the host processor,
wherein at least the second doorbell register is allocated as one of one or more dedicated registers for use only with operations of the third-party processor.

2. The electronic device of claim 1, wherein the storage device includes controller circuitry configured to,
receive an enable signal, and
determine a number of the plurality of doorbell registers to allocate as the one or more dedicated registers based on the enable signal.

3. The electronic device of claim 1, wherein the third-party processor is configured to write data to the storage device or read data from the storage device based on a peer-to-peer communication.

4. The electronic device of claim 1, wherein each of the first and second command queues is a queue pair including a submission queue and a completion queue.

5. The electronic device of claim 4, wherein each of the plurality of doorbell registers is configured to store a pointer that indicates a tail of a submission queue and a pointer that indicates a head of a completion queue.

6. The electronic device of claim 1, wherein the third-party processor is first third-party processor from among a plurality of third-party processors that are included in the electronic device, the plurality of third-party processors including at least a second third-party processor in addition to the first third-party processor,
wherein the second third-party processor is configured to perform a command queue based interface operation with the storage device without the intervention of the host processor, and
wherein an order in which controller circuitry of the storage device fetches and processes commands from the first third-party processor and the second third-party processor connected to the storage device is determined based on a priority or a characteristic of each of the first third-party processor and the second third-party processor.

7. The electronic device of claim 1, wherein a restrictive condition different from a restrictive condition applied to the first interface operation is applied to the second interface operation.

8. The electronic device of claim 1, wherein the storage device further comprises:
a non-volatile memory; and
a buffer memory, and
wherein controller circuitry of the storage device is configured to read a data requested by the third-party processor from the non-volatile memory and store the read data in the buffer memory.

9. The electronic device of claim 8, wherein the controller circuitry of the storage device is configured to transmit address information of a partial area of the buffer memory in which the read data is stored to the third-party processor.

10. The electronic device of claim 1, wherein the first interface operation and the second interface operation are performed based on a NVM Express (NVMe) protocol.

11. A storage device configured to communicate with a host and a third-party device, the storage device comprising:
a non-volatile memory; and
controller circuitry configured to manage an operation of writing data to the non-volatile memory or an operation of reading data from non-volatile memory,
wherein the controller circuitry comprises a plurality of doorbell registers, at least one of the plurality of doorbell registers is allocated for an interface operation with the third-party device, and the interface operation with the third-party device is performed based on a command queue, without a intervention of the host,
pointers corresponding to the command queue being stored in the at least one doorbell register, and
wherein the at least the doorbell register is allocated as one of one or more dedicated registers for use only with operations of the third-party device.

12. The storage device of claim 11, wherein the controller circuitry is configured to,
receive an enable signal, and
determine a number of the plurality of doorbell registers to allocate as the one or more dedicated registers for use only with operations of the third-party device based on the enable signal.

13. The storage device of claim 12, wherein the controller circuitry further comprises a control register, and the controller circuitry is configured to determine the number of the plurality of doorbell registers to allocate as one or more dedicated registers for use only with operations of the third-party device based on number information stored in the control register.

14. The storage device of claim 11,
wherein the storage device further comprises a buffer memory, and a data requested from the third-party device is read from the non-volatile memory and stored in the buffer memory.

15. The storage device of claim 14, wherein the controller circuitry of the storage device is configured to transmit address information of a partial area of the buffer memory in which the requested data is stored to the third-party device.

16. The storage device of claim 11, wherein the third-party device is a Graphic Processing Unit (GPU),
wherein the host is a Central Processing Unit (CPU) that implements a General-Purpose computing on Graphics Processing Units (GPGPU) application, and
wherein the storage device is configured to receive a file to be input to the GPU from the CPU, store the received file in the non-volatile memory, and output the file stored in the non-volatile memory from the non-volatile memory to the GPU in response to request from the GPU.

17. The storage device of claim 11, wherein the controller circuitry of the storage device in configured such that the interface operation with the third-party device is performed based on a NVMe protocol.

18. A storage device configured to communicate with a host and a third-party device, the storage device comprising:
a buffer memory;
a non-volatile memory; and
controller circuitry configured to manage an operation of writing a data to the non-volatile memory or an operation of reading a data from non-volatile memory,
wherein the controller circuitry comprises at least one doorbell register configured to store pointers corresponding to a submission queue and a completion queue for communicating with the third-party device, and
wherein the controller circuitry is configured to read data requested by the third-party device from the non-volatile memory and store the read data in the buffer memory in response to a command received from the third-party device,
wherein the at least the doorbell register is allocated as one of one or more dedicated registers for use only with operations of the third-party device.

19. The storage device of claim 18, wherein the controller circuitry is configured such that a completion queue entry written by the controller circuitry in the completion queue after the command is processed comprises an address information of a partial area of the buffer memory in which the requested data is stored.

20. The storage device of claim 18, wherein the controller circuitry is configured such that an interrupt signal generated by the controller circuitry after the command is processed comprises an address information of a partial area of the buffer memory in which the requested data is stored.

* * * * *